US011652909B1

(12) United States Patent
Tang et al.

(10) Patent No.: US 11,652,909 B1
(45) Date of Patent: May 16, 2023

(54) TCP SESSION CLOSURE IN CONTAINER ORCHESTRATION SYSTEM

(71) Applicant: INTERNATIONAL BUSINESS MACHINES CORPORATION, Armonk, NY (US)

(72) Inventors: Gang Tang, Nanjing (CN); Hong Jun Tu, Beijing (CN); Jian Guo Liu, Beijing (CN); Jun Wei JW Zhao, WuXi (CN); Hongsen Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/691,171

(22) Filed: Mar. 10, 2022

(51) Int. Cl.
*H04L 69/16* (2022.01)
*H04L 43/0811* (2022.01)
*H04L 43/0805* (2022.01)

(52) U.S. Cl.
CPC .......... *H04L 69/16* (2013.01); *H04L 43/0805* (2013.01); *H04L 43/0811* (2013.01)

(58) Field of Classification Search
CPC . H04L 43/20; H04L 43/0805; H04L 43/0811; H04L 41/5019; H04L 67/10; H04L 67/141; H04L 69/16; H04L 63/1408; H04L 61/5007; H04L 67/01; G06F 2009/45562; G06F 2009/45595
See application file for complete search history.

(56) References Cited

U.S. PATENT DOCUMENTS 8,812,695 B2    8/2014  Luna
9,043,472 B1 *  5/2015  Chau ................ H04L 43/10
                                       709/227
9,645,811 B2    5/2017  Carlen
10,791,166 B2   9/2020  Yu
2016/0094661 A1 * 3/2016 Jain ................. H04L 67/63
                                       709/227

(Continued)

FOREIGN PATENT DOCUMENTS

CN    103618738 A      3/2014
CN    111917608 A  * 11/2020  .......... H04L 43/0811
CN    112600690 B  *  5/2022  .......... H04L 41/0813

OTHER PUBLICATIONS

Ding et al., "Heartbeat Mechanism for The Timed Detection of Transmission Control Protocol Connection Failures", https://priorart.ip.com/IPCOM/000249663, IPCOM000249663D, Mar. 15, 2017, pp. 1-9.

(Continued)

*Primary Examiner* — Glenton B Burgess
*Assistant Examiner* — Rachelj Hackenberg
(74) *Attorney, Agent, or Firm* — Brandon L. Stephens

(57) ABSTRACT

Disclosed are a computer-implemented method, a system and a computer program product for TCP session closure in a container orchestration system. In the computer-implemented method for TCP session closure in a container orchestration system, a first pod being not alive in a second node can be determined by one or more processing units at a first node. A TCP session between a second pod in the first node and the first pod can be determined by one or more processing units at the first node based on a pod IP address of the first pod. The TCP session between the second pod and the first pod can be closed by one or more processing units at the first node.

20 Claims, 9 Drawing Sheets

(56) References Cited

U.S. PATENT DOCUMENTS

2018/0302270 A1* 10/2018 Schreter .............. H04L 41/0677
2020/0084088 A1*  3/2020 Zhu .................... H04L 41/0677
2021/0328858 A1* 10/2021 Asveren ............. H04L 41/0668

OTHER PUBLICATIONS https://docs.openshift.com/container-platform/4.7/networking/verifying-connectivity-endpoint.html#verifying-connectivity-endpoint, "Verifying connectivity to an endpoint", Red Hat, 2021 pp. 1-11.
https://kubernetes.io/docs/concepts/_print/, "Concepts", Kubernetes, Nov. 9, 2021, (5 parts),pp. 1-528.
https://www.rabbitmq.com/heartbeats.html, "Detecting Dead TCP Connections with Heartbeats and TCP Keepalives", RabbitMQ, © 2007-2022, pp. 1-6.
Mell et al., "The NIST Definition of Cloud Computing", National Institute of Standards and Technology, Special Publication 800-145, Sep. 2011, pp. 1-7.

* cited by examiner

700

DETERMINE A CLUSTER IP ADDRESS ~710

DETERMINE THE TCP SESSION BASED ON THE CLUSTER IP ADDRESS ~720

TCP SESSION CLOSURE IN CONTAINER ORCHESTRATION SYSTEM

BACKGROUND

The present disclosure relates to Transmission Control Protocol (TCP) session closure, and more specifically, to a computer-implemented method, a system, and a computer program product for TCP session closure in a container orchestration system.

Container-based clouds are widely used in various service infrastructures because they are lighter and more portable than a Virtual Machine (VM) based infrastructure and are configurable in both bare metal and VM environments. In a container orchestration system such as Kubernetes, which plays the role of an orchestrator to manage the containers, the basic unit to be managed is a pod comprising one or more containers. Different pods can communicate with each other via TCP sessions.

SUMMARY

According to one embodiment of the present disclosure, there is provided a computer-implemented method for Transmission Control Protocol (TCP) session closure in a container orchestration system. In this method, a first pod being not alive in a second node can be determined by one or more processing units at a first node. A TCP session between a second pod in the first node and the first pod can be determined by one or more processing units at the first node based on a pod IP address of the first pod. The TCP session between the second pod and the first pod can be closed by one or more processing units at the first node.

According to another embodiment of the present disclosure, there is provided a system for Transmission Control Protocol (TCP) session closure in a container orchestration system. The system comprises one or more processors, a memory coupled to at least one of the processors and a set of computer program instructions stored in the memory. When executed by at least one of the processors, the set of computer program instructions perform, at a first node, following actions. A first pod being not alive in a second node can be determined. A TCP session between a second pod in the first node and the first pod can be determined based on a pod IP address of the first pod. The TCP session between the second pod and the first pod can be closed.

According to a yet another embodiment of the present disclosure, there is provided computer program product for Transmission Control Protocol (TCP) session closure in a container orchestration system. The computer program product comprises a computer readable storage medium having program instructions embodied therewith. The program instructions are executable by a processor at a first node to cause the processor to perform following actions. A first pod being not alive in a second node can be determined. A TCP session between a second pod in the first node and the first pod can be determined based on a pod IP address of the first pod. The TCP session between the second pod and the first pod can be closed.

BRIEF DESCRIPTION OF THE DRAWINGS

The following detailed description, given by way of example and not intended to limit the exemplary embodiments solely thereto, will best be appreciated in conjunction with the accompanying drawings, in which.

DETAILED DESCRIPTION

Figure 1:
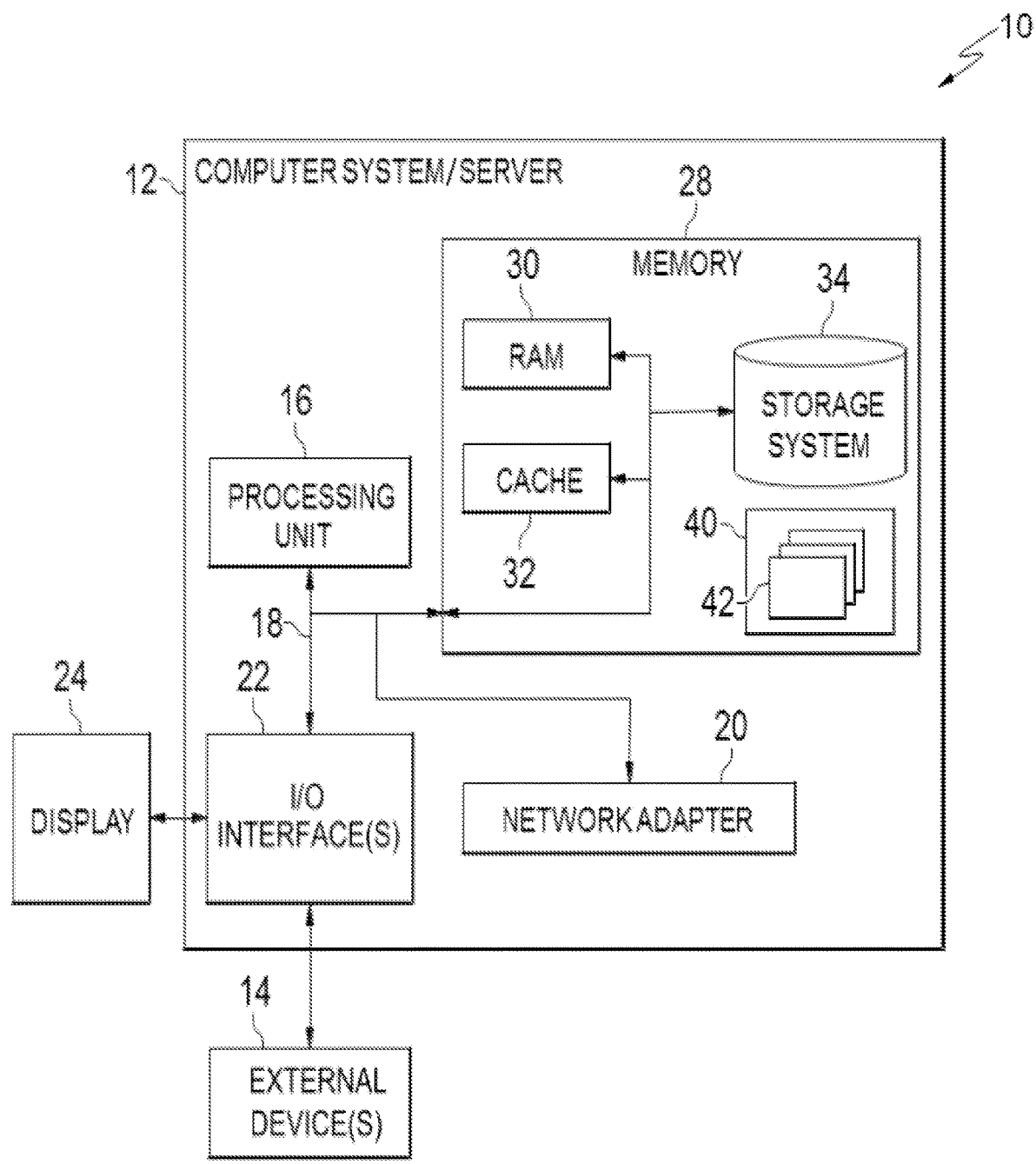
FIG. 1 depicts a cloud computing node 10 according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although the present disclosure includes a detailed description on cloud computing, implementation of the teachings recited herein are not limited to a cloud computing environment. Rather, embodiments of the present disclosure are capable of being implemented in conjunction with various other types of computing environments now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts the cloud computing node 10 according to an embodiment of the present disclosure. The cloud computing node 10 is only one example of a suitable cloud computing node and is not intended to suggest any limitation as to the scope of use or functionality of embodiments of the present disclosure described herein. Regardless, the cloud computing node 10 is capable of being implemented and/or performing any of the functionalities set forth herein.

In the cloud computing node 10 there is a computer system/server 12 and/or a portable electronic device such as a communication device, which is operational with numerous other general purpose or special purpose computing system environments or configurations. Examples of computing systems, environments, and/or configurations that may be suitable for use with a computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including system memory 28 to the processing unit 16.

The bus 18 represents one or more of several types of bus structures, including a memory bus or memory controller, a peripheral bus, an accelerated graphics port, and a processor or local bus using a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 may include a variety of computer system readable media. Such media may be any available media that is accessible by the computer system/server 12, and it may include both volatile and non-volatile media, removable and non-removable media.

System memory 28 can include computer system readable media in the form of volatile memory, such as a random access memory (RAM) 30 and/or a cache memory 32. The computer system/server 12 may further include other removable/non-removable, volatile/non-volatile computer system storage media. By way of example, a storage system 34 can be provided for reading from and writing to a non-removable, non-volatile magnetic media (not shown and typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the present disclosure.

A program/utility 40, having a set (at least one) of program modules 42, may be stored in the memory 28 by way of example, and not limitation, as well as an operating system, one or more application programs, other program modules, and/or program data. Each of the operating system, one or more application programs, other program modules, and/or program data or some combination thereof, may include an implementation of a networking environment. The program modules 42 may carry out the functions and/or methodologies of embodiments of the present disclosure as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Further, the computer system/server 12 can communicate with one or more networks such as a local area network (LAN), a general wide area network (WAN), and/or a public network (e.g., the Internet) via network adapter 20. As depicted, a network adapter 20 may communicate with the other components of the computer system/server 12 via the bus 18. It should be understood that other hardware and/or software components could be used in conjunction with the computer system/server 12. Examples, include, but are not limited to: a microcode, device drivers, redundant processing units, external disk drive arrays, RAID systems, tape drives, and data archival storage systems, etc.

Figure 2:
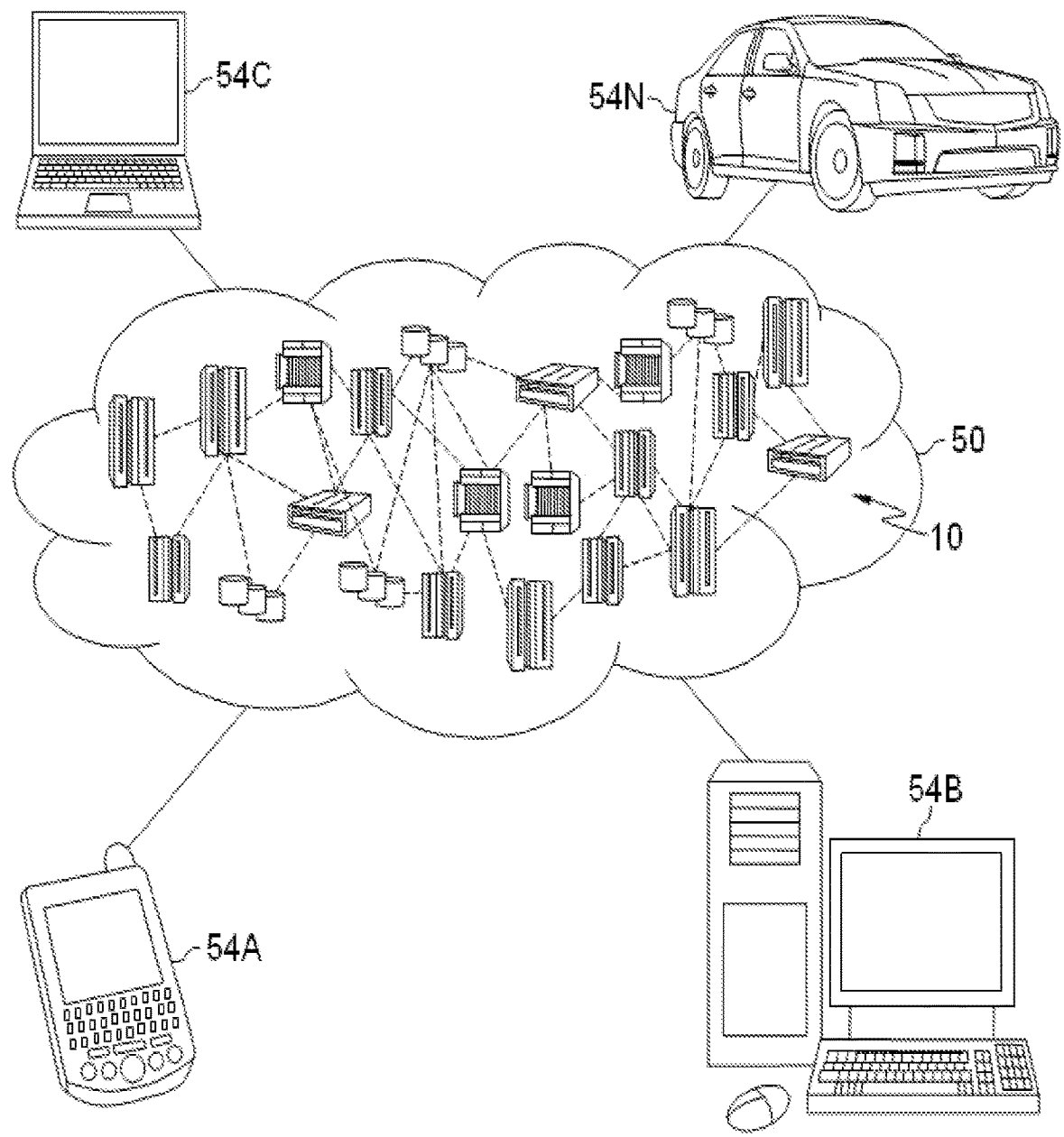
FIG. 2 depicts a cloud computing environment 50 according to an embodiment of the present disclosure.

Referring now to FIG. 2, the illustrative cloud computing environment 50 is depicted according to an embodiment of the present disclosure. As shown, the cloud computing environment 50 includes one or more cloud computing nodes 10 with which local computing devices used by cloud consumers may communicate, such as, for example, a personal digital assistant (PDA) or a cellular telephone 54A, a desktop computer 54B, a laptop computer 54C, and/or an automobile computer system 54N. The cloud computing nodes 10 may communicate with one another. They may be grouped physically or virtually, in one or more networks, such as Private, Community, Public, or Hybrid clouds as described hereinabove, and/or a combination thereof. This allows the cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and the cloud computing environment 50 can communicate with any type of computerized device over any type of network and/or network addressable connection (e.g., using a web browser).

Figure 3:
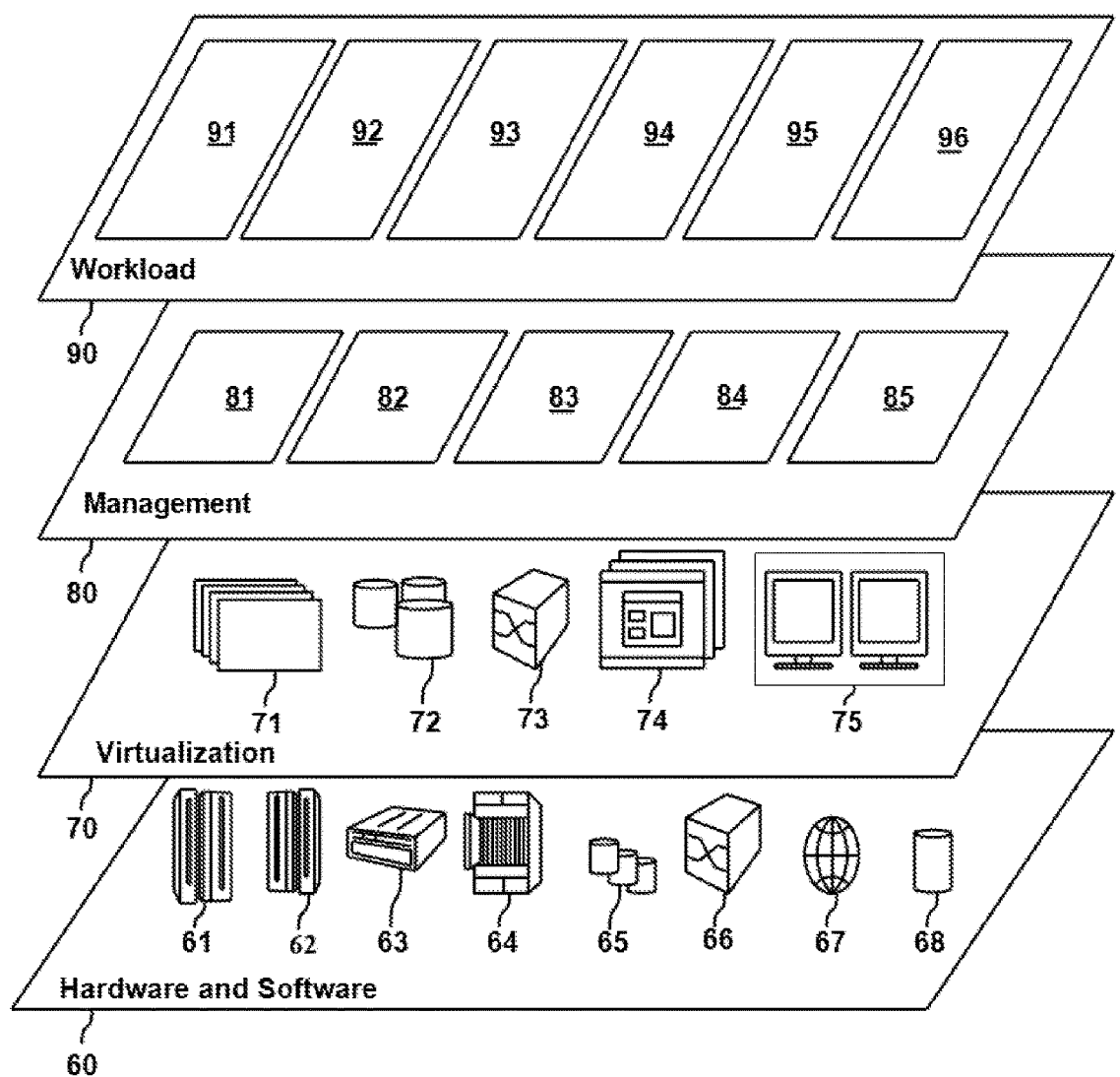
FIG. 3 depicts abstraction model layers according to an embodiment of the present disclosure.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and TCP session closure 96.

The functional abstraction layers in FIG. 3 are illustrative. However, when necessary, one or more layers can be added thereto, and one or more layers in FIG. 3 can be merged or omitted. In addition, in each layer of FIG. 3, some components can be omitted or merged, and one or more components can be added.

As described in the above, a container orchestration system such as Kubernetes can manage containers in the unit of a pod. The pod is a basic unit to be managed by a container orchestration system, comprising one or more containers. The containers within one pod can share the same network namespace. Each pod can be assigned a unique pod IP address. Different pods managed by the container orchestration system can communicate with each other via TCP sessions which are established through TCP connections. The pods can be deployed on nodes. A node is a unit of computing hardware, which can be for example a physical machine in a data center, or a virtual machine hosted on a cloud platform.

The container orchestration system such as Kubernetes may break the conventional monolithic software into microservices. Persistent connections or sessions may be used in application protocols such as HTTP/1.1 (RFC 2068), databases, GRPC and WebSocket, because the persistent sessions can reduce network congestion by reducing the number of packets caused by opening TCP connections. Therefore, numerous connections among the microservices are persistent. For instance, there can be over 100 persistent TCP connections among 401 pods in a container cloud. To reduce overhead packets caused by establishing TCP connections, a keep-alive interval, during which a heartbeat packet is transmitted to check a survival state of a counterpart, can be for example between 30 minutes to 120 minutes.

In a conventional container-based system managed by for example Kubernetes, if a pod crashes or shuts down, a new pod will replace it. However, the clients of the crashed pod cannot be notified to close the long-lived sessions to the crashed pod and to connect to the new pod before the current keep-alive interval ends. This problem imposes a negative impact on the availability of services. In particular, it can lead to data inconsistency among services.

Figure 4:
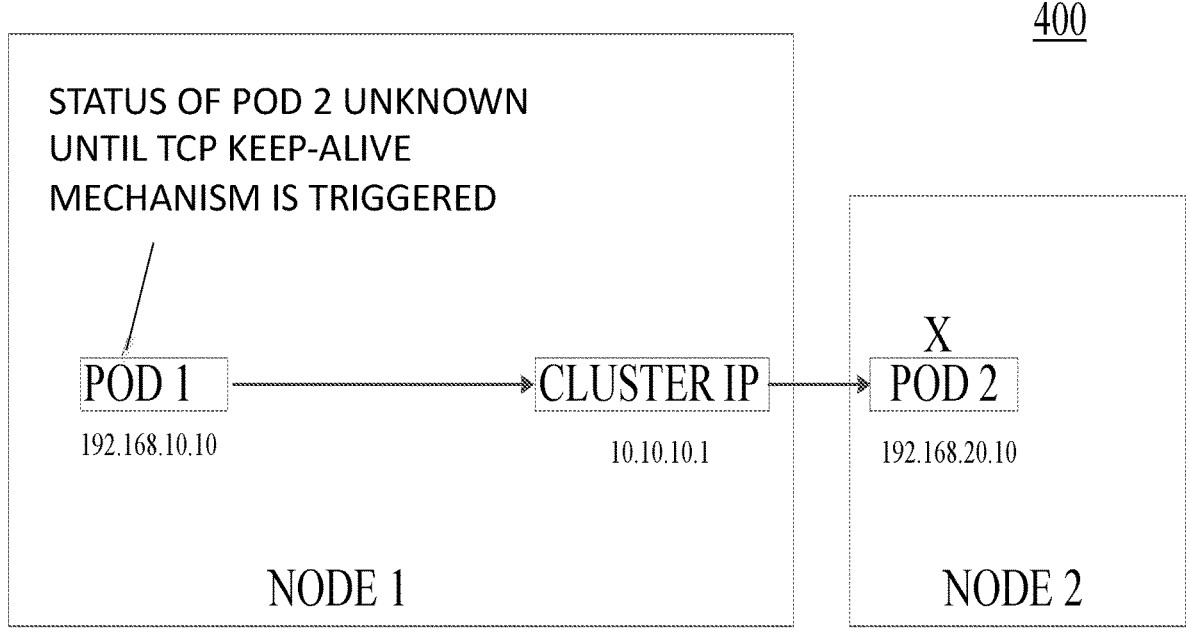
FIG. 4 depicts a scenario 400 in a conventional container orchestration system.

Referring now to FIG. 4, the scenario 400 is shown in a conventional container orchestration system. As shown in FIG. 4, pod 1 in node 1 acts as a client pod with a pod IP address of 192.168.10.10, and pod 2 in node 2 acts as a server pod with a pod IP address of 192.168.20.10. Pod 1 is accessing a service provided by pod 2 through a TCP session via a cluster IP address of 10.10.10.1 in node 1. During the communication, suppose pod 2 crashes or shuts down, then pod 1 cannot receive packets from pod 2, but pod 1 cannot know whether it is because pod 2 crashes or because pod 2 is not sending packets before a keep-alive interval ends, for example 2 hours. Therefore, pod 1 will not close the current TCP session and connect to another server pod before the keep-alive interval ends. The situation may cause pod 1 to miss services and lead to data inconsistency among services. Therefore, identification and closure of an obsoleted TCP session, especially a long-lived session, is desirable.

Please note that the cluster IP address mentioned in the above may be a virtual IP address set in a node for the pods (e.g., within the node to access a service). When the client pod within the node accesses the service through the cluster IP address, the node will map the cluster IP address to a pod IP address of a server pod selected from one or more server pods which can provide the service, and then a session will be established between the client pod and the one or more server pods.

Embodiments of the present disclosure may solve technical problems described above, and propose a method, a system and computer program product for closing a TCP session in a container orchestration system, enabling client pods to start a new connection to an alive pod before the keep-alive interval ends and without requiring any heartbeat mechanism in client pods.

Figure 5:
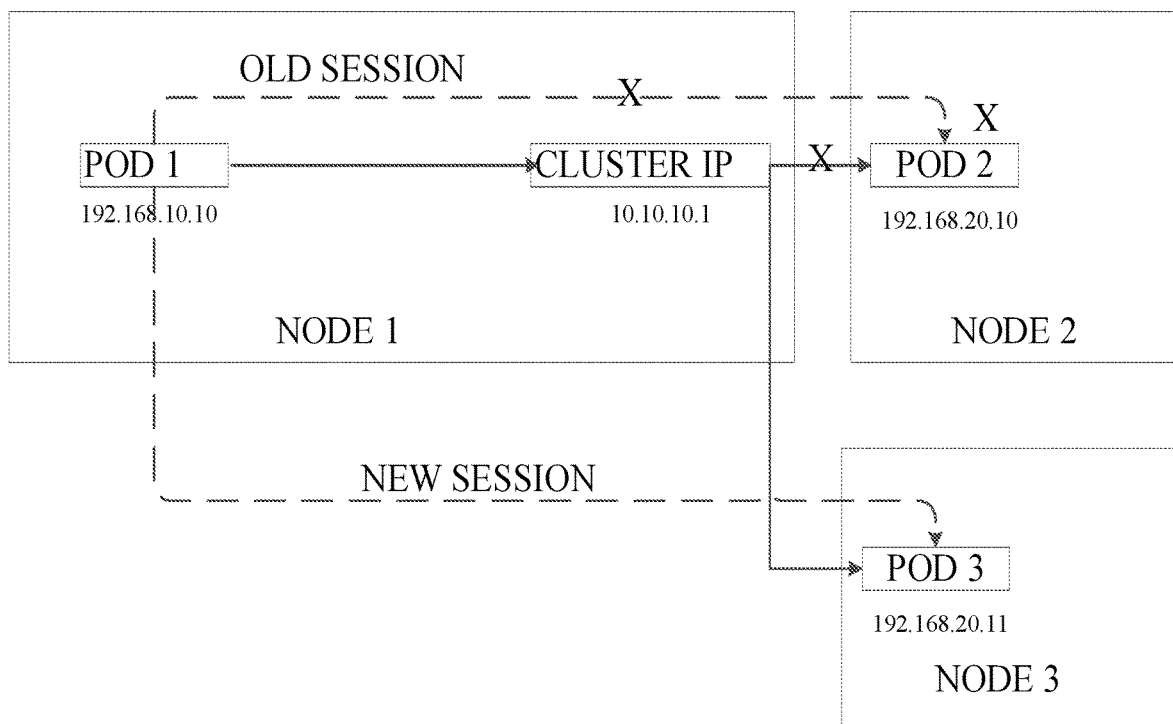
FIG. 5 depicts a schematic diagram of a scenario 500 according to an embodiment of the present disclosure.

FIG. 5 depicts the schematic diagram of the scenario 500 according to an embodiment of the present disclosure. As can be seen in FIG. 5, if pod 2 crashes, the TCP session between pod 1 and pod 2 ("old session") will be closed according to the method, the system or the computer program product provided by embodiments of the present disclosure. Another alive pod, for example pod 3 in node 3, may be assigned by the container orchestration system, and pod 1 can start a new session to pod 3 by restarting access to the cluster IP. Then, the service can be provided by pod 3 when the new session is established.

It should be noted that the TCP session closure in the container orchestration system according to embodiments of the present disclosure could be implemented by the computer system/server 12 of FIG. 1. Embodiments of the present disclosure can provide determination and TCP session closure between a client pod and a server pod being not alive in a container orchestration system such as Kubernetes. Therefore, the client pod can start a new connection to an alive server pod before the keep-alive interval ends. Embodiments of the present disclosure do not require the client pod to have any heartbeat mechanism.

Figure 6:
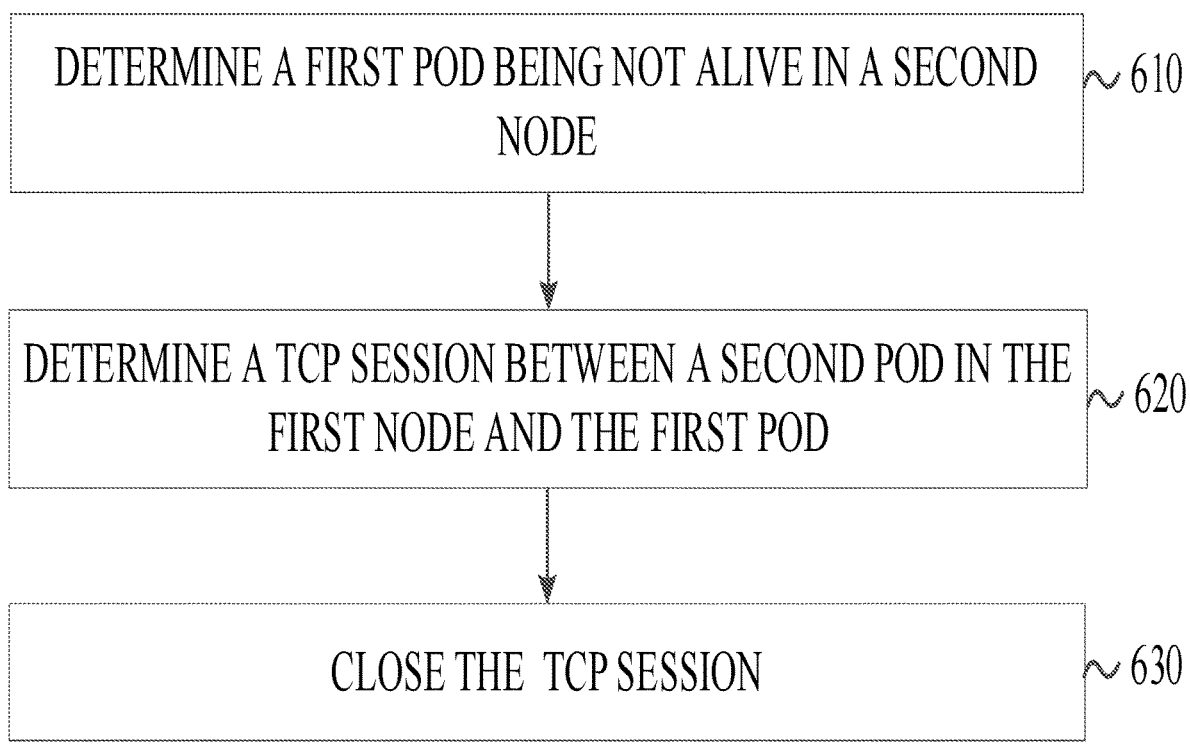
FIG. 6 depicts a flowchart of a method 600 for a TCP session closure in a container orchestration system according to an embodiment of the present disclosure.

Referring now to FIG. 6, the flowchart of the method 600 for TCP session closure in a container orchestration system according to an embodiment of the present disclosure is shown. The method 600 can be implemented by one or more processing units 16 at each node managed by the container orchestration system, for example, implemented by computer system/server 12 of FIG. 1. The following descriptions will be focused on the actions performed at one node, for example a first node among a plurality of nodes managed by the container orchestration system.

At step 610, a first pod being not alive in a second node can be determined. Being not alive here means that the pod does not work, has crashed, shut down, and the like. Taking the scenario illustrated in FIG. 5 as an example, crashed pod 2 (first pod) in node 2 (second node) can be determined at node 1 (first node) at step 610. The container orchestration system can automatically detect and record a healthy state (e.g., alive or not alive, available or not available, etc.) of each pod, and the container orchestration system can share the information with each node, which can then use the information to determine whether any particular pod is alive.

In some embodiments, step 610 can comprise: obtaining availability of a plurality of pods from a managing unit in the container orchestration system and determining the first pod being not alive in response to the first pod being not available. For example, in case the container orchestration system is Kubernetes, the managing unit can be the Kube-APIserver in Kubernetes. The Kube-APIserver can monitor or detect availability of each pod, and each node can get a list of available pods from the Kube-APIserver. Each node can compare the newly obtained list with the old list to determine whether any pod is removed from the list and thus not available anymore. For example, if the first pod (pod 2) is not available anymore based on the comparison, the first pod (pod 2) can be determined to be not alive.

In some embodiments, the pod IP address of each pod may be used to identify the pod when determining availability of the pod. For example, the pod IP addresses of all available pods can be recorded in the container orchestration system as available pod IP addresses, and in response to a pod IP address being removed from the available pod IP addresses, it can be determined that the pod corresponding to the removed pod IP address is not available and thus not alive.

In some embodiments, the managing unit in the container orchestration system can directly inform each node of removing of any available pod IP address, and then each node can determine that the pod with the removed pod IP address is not alive.

After a pod being not alive is determined, an affected TCP session associated with that pod can be determined. For example, each node can determine whether it has a pod that has a TCP session with the pod that is determined to be not alive. At step 620, a TCP session between the second pod in the first node and the first pod can be determined based on a pod IP address of the first pod. Taking the scenario illustrated in FIG. 5 as an example, TCP session between pod 1 (client pod/second pod) in node 1 (first node) and pod 2 (server pod/first pod) in node 2 (second node) can be determined at node 1 based on the pod IP address of pod 2 at step 620.

Figure 7:
FIG. 7 depicts a process 700 of how to determine the TCP session between a second pod and a first pod based on the pod IP address of the first pod according to an embodiment of the present disclosure.

FIG. 7 shows a process 700 of how to determine the TCP session between the second pod in the first node and the first pod based on the pod IP address of the first pod according to an embodiment of the present disclosure. At each node managed by the container orchestration system, a connection information database can be stored, which can record a mapping between a cluster IP address of a service and a pod IP address of a selected pod from among a plurality of pods that can provide the service. The selected pod can be selected from among the plurality of pods based on an access strategy at each node. Therefore, at step 710, a cluster IP address associated with the pod IP address of the first pod can be determined according to the connection information database at the first node. Taking the scenario illustrated in FIG. 5 as an example, a mapping between the cluster IP address (10.10.10.1) of a service and the pod IP address (192.168.20.10) of pod 2 (first pod) among a plurality of pods (pod 2, pod3, etc.) is recorded in the connection information database, and thus the cluster IP address (10.10.10.1) associated with the pod IP address (192.168.20.10) of pod 2 (first pod) can be determined. The above-mentioned connection information database can be for example the conntrack table in a Linux system. The conntrack table can have connection entries recording the above-mentioned mapping between the cluster IP address and the pod IP address of the selected pod. As another example, the connection information database can be obtained through Netfilter in a Linux system.

Thereafter, at step 720, the TCP session between the second pod and the first pod can be determined based on the cluster IP address according to the connection information database. The connection information database at each node can also record four-element tuples of TCP sessions. Each four-element tuple may include a source IP address, a source port, a destination IP address and a destination port of the TCP session. The four-element tuple may define a socket for a TCP session and thus define the TCP session. Therefore, in some embodiments, determining the TCP session based on the cluster IP address can be implemented through determining the four-element tuple in the connection information database with a destination IP address which is the same as the cluster IP address determined at step 710 as the four-element tuple of the TCP session. Taking the scenario illustrated in FIG. 5 as an example, a four-element tuple recorded in the connection information database and determined at step 720 can be for example (src=192.168.10.10, dst=10.10.10.1, sport=33897, dport=80), where src represents the source IP address, dst represents the destination IP address, sport represents the source port, and dport represents the destination port. This four-element tuple is determined because the destination IP address (10.10.10.1) therein is the same as the cluster IP address determined at step 710. Further, the source IP address of the determined four-element tuple of the TCP session is the same as the pod IP address of pod 1, and thus it can also be determined that the client pod affected by the server pod 2 being not alive is pod 1.

Referring back to FIG. 6, after the TCP session between the second pod and the first pod is determined, the TCP session can be closed at step 630, so that the second pod (e.g., the client pod) can initiate the new session to a healthy server pod. There can be various ways to close a session. For example, it can be implemented by making a system call to destroy the TCP session.

Figure 8:
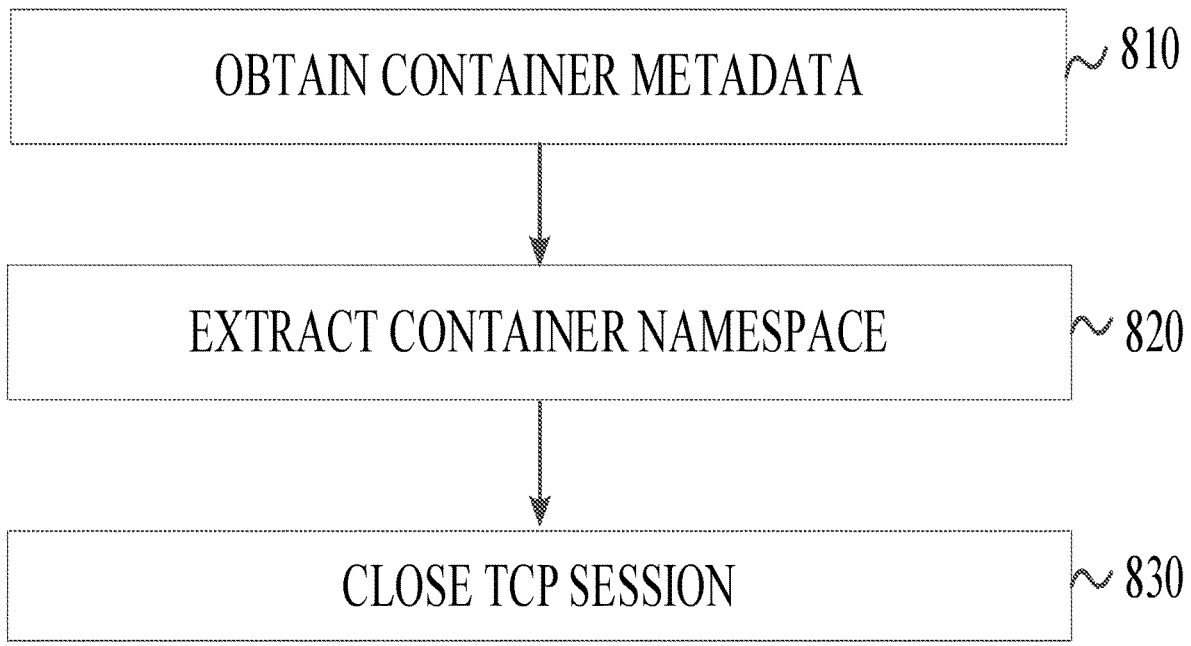
FIG. 8 depicts how to close the TCP session between the second pod and the first pod according to an embodiment of the present disclosure.

FIG. 8 depicts how to close the TCP session between the second pod and the first pod according to an embodiment of the present disclosure. In the embodiment of FIG. 8, the TCP session can be closed through finding the corresponding container namespace first and then closing the TCP session in the container namespace. Therefore, at step 810, container metadata can be obtained based on the source IP address in the above determined four-element tuple. There are various ways to implement step 810. For example, in the Kubernetes, using the source IP address as an input, container metadata can be obtained from Kube-APIserver, the ETCD for storing metadata, or the local CRI (container runtime interface), etc. The container metadata can comprise PID (Process Identification), container namespace, etc. At step 820, the container namespace in the container metadata can be extracted. At step 830, the TCP session can be closed in the extracted container namespace. For example, a system call can be made in the extracted container namespace to destroy the TCP session.

In view of the above, embodiments of the present disclosure can provide determination and closure of a TCP session between a client pod and a server pod being not alive in a container orchestration system. Then, the client pod can start a new connection to an alive server pod before the keep-alive interval ends, which may improve availability of services and avoid data inconsistency among services. It should be noted that the one or more processing units mentioned above can work with a daemon at each node to perform the actions described above. The daemon can be implemented by any form of software.

Figure 9:
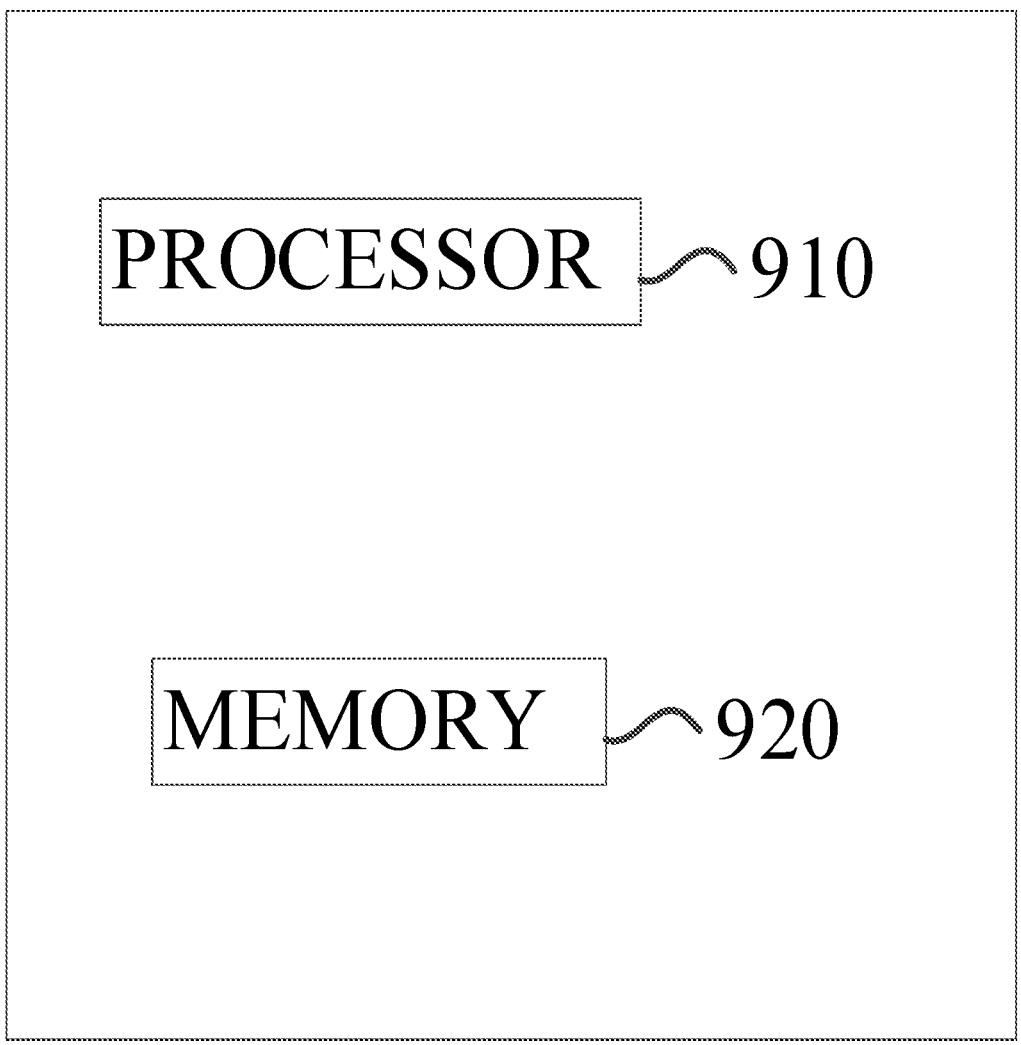
FIG. 9 depicts a system 900 for the TCP session closure in the container orchestration system according to an embodiment of the present disclosure.

Referring now to FIG. 9, the system 900 is shown for TCP session closure in the container orchestration system according to an embodiment of the present disclosure. The system 900 can comprise one or more processors 910 and a memory 920 coupled to the one of the processors 910. A set of computer program instructions may be stored in the memory 920. When executed by at least one of the processors 910, the set of computer program instructions may perform, at the first node, a series of actions for TCP session closure in the container orchestration system. The first pod being not alive in the second node can be obtained. The TCP session between the second pod in the first node and the first pod can be determined based on the pod IP address of the first pod. The TCP session between the second pod and the first pod can be closed.

In an embodiment, availability of the plurality of pods can be obtained from a managing unit in the container orchestration system. The first pod among the plurality of pods can be determined to be not alive in response to the first pod being not available.

In an embodiment, the first pod may be determined as being not available in response to the pod IP address of the first pod being removed from available pod IP addresses recorded in the container orchestration system.

In an embodiment, a cluster IP address associated with the pod IP address of the first pod can be determined according to a connection information database at the first node. The TCP session between the second pod and the first pod can be determined based on the cluster IP address according to the connection information database.

In an embodiment, the connection information database may be a conntrack table at the first node.

In an embodiment, the TCP session between the second pod and the first pod may include a four-element tuple with a source IP address, a source port, a destination IP address and a destination port, and a four-element tuple in the connection information database with a destination IP address which is the same as the cluster IP address can be determined as the four-element tuple of the TCP session between the second pod and the first pod.

In an embodiment, container metadata can be obtained based on the source IP address in the four-element tuple. The container namespace in the container metadata can be extracted. The TCP session can be closed in the container namespace.

In an embodiment, a system call can be made to destroy the TCP session in the container namespace.

In an embodiment, the set of computer program instructions may be working as a daemon at the first node.

The descriptions above related to the process of the method 600 can be applied to the system 900, details are omitted herein for conciseness.

It should be noted that the processing achieved by the system for TCP session closure in the container orchestration system according to embodiments of the present disclosure could be implemented by the computer system/server 12 of FIG. 1.

According to another embodiment of the present disclosure, a computer program product for TCP session closure in the container orchestration system is disclosed. The computer program product comprises a computer readable storage medium having program instructions embodied therewith, and the program instructions are executable by a processor at the first node. When executed, the program instructions may cause the processor to perform one or more of the above-described procedures.

It should also be noted that the terms such as "first" and "second" as used herein may only be for the purpose of distinguishing one element from another element without indicating an order and/or importance of the corresponding elements.

The sequence of actions described in connection with the Figures is only exemplary and cannot be construed as a limitation to the present disclosure. When necessary, the sequence of actions can be modified. In addition, one or more actions can be omitted, and more action can be added.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to help explain the principles of the embodiments, the practical application or technical advantages over technologies found in the marketplace, or to enable others of ordinary skill in the art to understand the embodiments disclosed herein.

What is claimed is:

1. A computer-implemented method for Transmission Control Protocol (TCP) session closure in a container orchestration system, comprising:
   determining, by one or more processing units at a first node, a first pod being not alive in a second node, wherein the container orchestration system automatically determines that the first pod is being not alive before a keep-alive interval ends without using a heartbeat mechanism;
   determining, by the one or more processing units at the first node, a TCP session between a second pod in the first node and the first pod based on a pod IP address of the first pod, wherein the first pod is a server pod and the second pod is a client pod; and
   closing, by the one or more processing units at the first node, the TCP session between the second pod and the first pod based on the container orchestration system automatically having determined that the first pod was being not alive before the keep-alive interval ends without using the heartbeat mechanism.

2. The computer-implemented method of claim 1, wherein the determining the first pod being not alive in the second node comprises:
   obtaining, by the one or more processing units at the first node, availability of a plurality of pods including the first pod from a managing unit in the container orchestration system; and
   determining, by the one or more processing units at the first node, the first pod among the plurality of pods being not alive in response to the first pod being not available.

3. The computer-implemented method of claim 2, wherein the first pod is determined as being not available in response to the pod IP address of the first pod being removed from available pod IP addresses recorded in the container orchestration system.

4. The computer-implemented method of claim 1, wherein the determining the TCP session between the second pod in the first node and the first pod based on the pod IP address of the first pod comprises:
   determining, by one or more processing units at the first node, a cluster IP address associated with the pod IP address of the first pod according to a connection information database at the first node; and
   determining, by one or more processing units at the first node, the TCP session between the second pod and the first pod based on the cluster IP address according to the connection information database.

5. The computer-implemented method of claim 4, wherein the connection information database is a conntrack table at the first node.

6. The computer-implemented method of claim 4, wherein the TCP session between the second pod and the first pod is defined by a four-element tuple with a source IP address, a source port, a destination IP address and a destination port, and
   wherein the determining the TCP session between the second pod and the first pod based on the cluster IP address according to the connection information database comprises:
   determining, by the one or more processing units at the first node, a four-element tuple in the connection information database with a destination IP address which is the same as the cluster IP address as the four-element tuple of the TCP session between the second pod and the first pod.

7. The computer-implemented method of claim 6, wherein the closing the TCP session between the second pod and the first pod comprises:
   obtaining, by the one or more processing units at the first node, container metadata based on the source IP address in the four-element tuple;
   extracting, by the one or more processing units at the first node, container namespace in the container metadata; and
   closing, by the one or more processing units at the first node, the TCP session in the container namespace.

8. The computer-implemented method of claim 7, wherein the closing the TCP session in the container namespace comprises:
   making, by the one or more processing units at the first node, a system call to destroy the TCP session in the container namespace.

9. The computer-implemented method of claim 1, wherein the one or more processing units are working with a daemon at the first node.

10. A system for Transmission Control Protocol (TCP) session closure in a container orchestration system, comprising:

one or more computer processors, one or more computer-readable storage media, and program instructions stored on the one or more of the computer-readable storage media for execution by at least one of the one or more processors, the program instructions including a method comprising:

determining a first pod being not alive in a second node, wherein the container orchestration system automatically determines that the first pod is being not alive before a keep-alive interval ends without using a heartbeat mechanism;

determining a TCP session between a second pod in the first node and the first pod based on a pod IP address of the first pod, wherein the first pod is a server pod and the second pod is a client pod; and closing the TCP session between the second pod and the first pod based on the container orchestration system automatically having determined that the first pod was being not alive before the keep-alive interval ends without using the heartbeat mechanism.

11. The system of claim 10, wherein the determining the first pod being not alive in the second node comprises:

obtaining availability of a plurality of pods including the first pod from a managing unit in the container orchestration system; and determining the first pod among the plurality of pods being not alive in response to the first pod being not available.

12. The system of claim 11, wherein the first pod is determined as being not available in response to the pod IP address of the first pod being removed from available pod IP addresses recorded in the container orchestration system.

13. The system of claim 10, wherein the determining the TCP session between the second pod in the first node and the first pod based on the pod IP address of the first pod comprises:

determining a cluster IP address associated with the pod IP address of the first pod according to a connection information database at the first node; and determining the TCP session between the second pod and the first pod based on the cluster IP address according to the connection information database.

14. The system of claim 13, wherein the connection information database is a conntrack table at the first node.

15. The system of claim 13, wherein the TCP session between the second pod and the first pod is defined by a four-element tuple with a source IP address, a source port, a destination IP address and a destination port, and wherein the determining the TCP session between the second pod and the first pod based on the cluster IP address according to the connection information database comprises:

determining a four-element tuple in the connection information database with a destination IP address which is the same as the cluster IP address as the four-element tuple of the TCP session between the second pod and the first pod.

16. The system of claim 15, wherein the closing the TCP session between the second pod and the first pod comprises:

obtaining container metadata based on the source IP address in the four-element tuple;

extracting container namespace in the container metadata; and closing the TCP session in the container namespace.

17. The system of claim 16, wherein the closing the TCP session in the container namespace comprises:

making a system call to destroy the TCP session in the container namespace.

18. The system of claim 10, wherein the set of computer program instructions is a daemon at the first node.

19. A computer program product for Transmission Control Protocol (TCP) session closure in a container orchestration system, the computer program product comprising:

one or more computer-readable storage media and program instructions stored on the one or more computer-readable storage media, the program instructions including a method, the method comprising:

determining a first pod being not alive in a second node, wherein the container orchestration system automatically determines that the first pod is being not alive before a keep-alive interval ends without using a heartbeat mechanism;

determining a TCP session between a second pod in the first node and the first pod based on a pod IP address of the first pod, wherein the first pod is a server pod and the second pod is a client pod: and closing the TCP session between the second pod and the first pod based on the container orchestration system automatically having determined that the first pod was being not alive before the keep-alive interval ends without using the heartbeat mechanism.

20. The computer program product of claim 19, wherein the determining the first pod being not alive in the second node comprises:

obtaining availability of a plurality of pods including the first pod from a managing unit in the container orchestration system; and determining the first pod among the plurality of pods being not alive in response to the first pod being not available.

\* \* \* \* \*